United States Patent
Yoon et al.

(10) Patent No.: US 7,697,089 B2
(45) Date of Patent: Apr. 13, 2010

(54) LIQUID CRYSTAL DISPLAY APPARATUS

(75) Inventors: Jong-Soo Yoon, Cheonan-si (KR); Dong-Ho Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 932 days.

(21) Appl. No.: 10/552,088

(22) PCT Filed: Mar. 16, 2004

(86) PCT No.: PCT/KR2004/000558

§ 371 (c)(1),
(2), (4) Date: Oct. 4, 2005

(87) PCT Pub. No.: WO2004/090619

PCT Pub. Date: Oct. 21, 2004

(65) Prior Publication Data

US 2006/0192747 A1 Aug. 31, 2006

(30) Foreign Application Priority Data

Apr. 8, 2003 (KR) .................. 10-2003-0021868

(51) Int. Cl.
*G02F 1/133* (2006.01)
*G02F 1/13357* (2006.01)
*F21V 8/00* (2006.01)

(52) U.S. Cl. .................. 349/65; 349/61; 349/68; 349/114; 362/231; 362/612; 362/613

(58) Field of Classification Search .................. 349/61, 349/65, 68, 70, 114; 345/102, 88; 362/612, 362/613, 614, 27, 231, 249.02, 310, 615, 362/621
See application file for complete search history.

(56) References Cited

U.S. PATENT DOCUMENTS 6,249,328 B1 6/2001 Fukuzawa et al. .............. 349/70
(Continued)

FOREIGN PATENT DOCUMENTS

KR 1020010013384 A 2/2001
(Continued)

OTHER PUBLICATIONS

PCT International Search Report; PCT/KR2004/000558; Dated: August 30, 2004.
(Continued)

*Primary Examiner*—Dung Nguyen
*Assistant Examiner*—Tai Duong
(74) *Attorney, Agent, or Firm*—Cantor Colburn LLP

(57) ABSTRACT

In an LCD apparatus (400) having simplified structure and improved luminance, a light supplying unit (100) supplies an LCD panel (280) with red light during a time corresponding to one-third of a frame, green light during the time and blue light during the time. A light reflective-transmissive unit is disposed between the light supplying unit (100) and the LCD panel assembly (200) to transmit the red light, the green light and the blue light and to reflect an external light from exterior of the LCD panel assembly (200). The LCD apparatus displays an image by means of white light as well as red light, green light and blue light, thereby improving luminance and simplifying structure.

9 Claims, 14 Drawing Sheets

U.S. PATENT DOCUMENTS

| | | | |
|---|---|---|---|
| 6,480,247 B1 | 11/2002 | Moon | 349/65 |
| 6,727,966 B2* | 4/2004 | Tanaka | 349/114 |
| 6,883,934 B2* | 4/2005 | Kawakami et al. | 362/261 |
| 6,897,912 B2* | 5/2005 | Kawakami et al. | 349/61 |
| 7,001,035 B2* | 2/2006 | Kawakami | 362/617 |
| 7,106,400 B1* | 9/2006 | Tsuda et al. | 349/113 |
| 2002/0057253 A1* | 5/2002 | Lim et al. | 345/102 |
| 2002/0093743 A1 | 7/2002 | Miyamae et al. | 359/619 |
| 2003/0011739 A1* | 1/2003 | Yoshihara et al. | 349/172 |
| 2003/0082314 A1 | 5/2003 | Higashi et al. | 428/1.31 |
| 2003/0112388 A1* | 6/2003 | Jang et al. | 349/113 |

FOREIGN PATENT DOCUMENTS

| | | |
|---|---|---|
| KR | 2001-0038242 A | 5/2001 |
| KR | 1020020039141 A | 5/2002 |
| KR | 1020030004062 A | 1/2003 |
| KR | 1020030017372 A | 3/2003 |

OTHER PUBLICATIONS

Written Opinion of the International Searching Authority of Corresponding PCT Application: PCT/KR2004/000558; Dated: August 30, 2004.

* cited by examiner

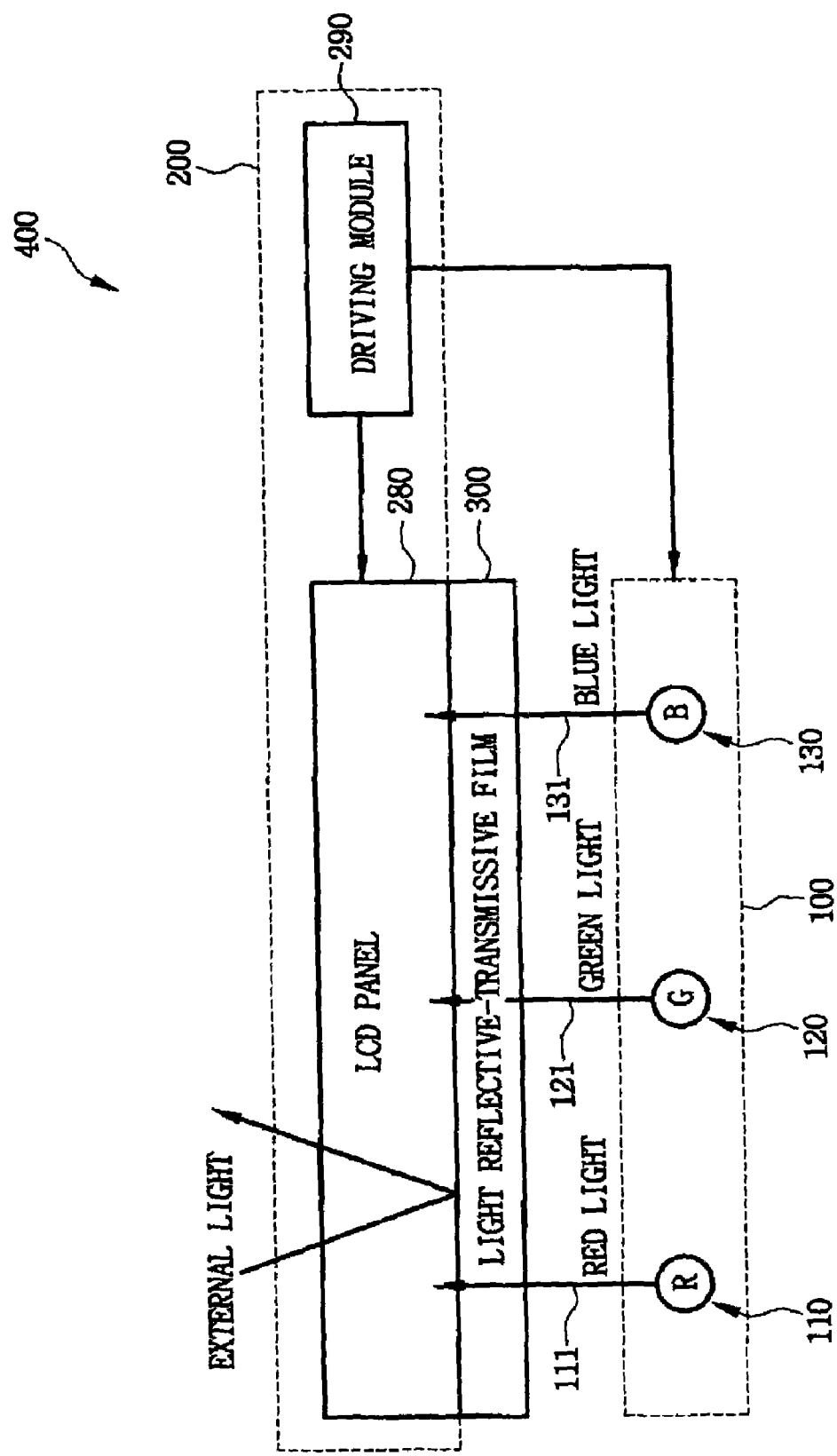
[Fig. 1]

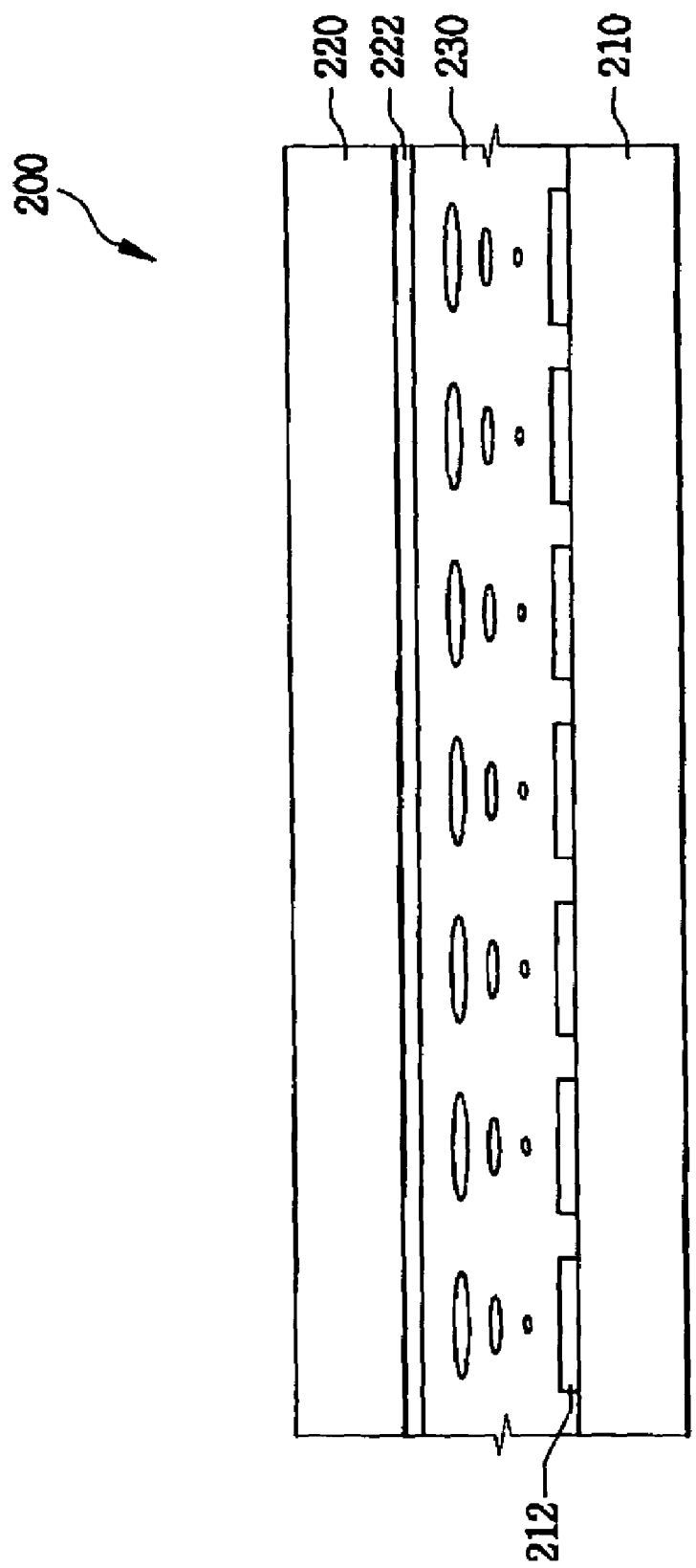
[Fig. 2]

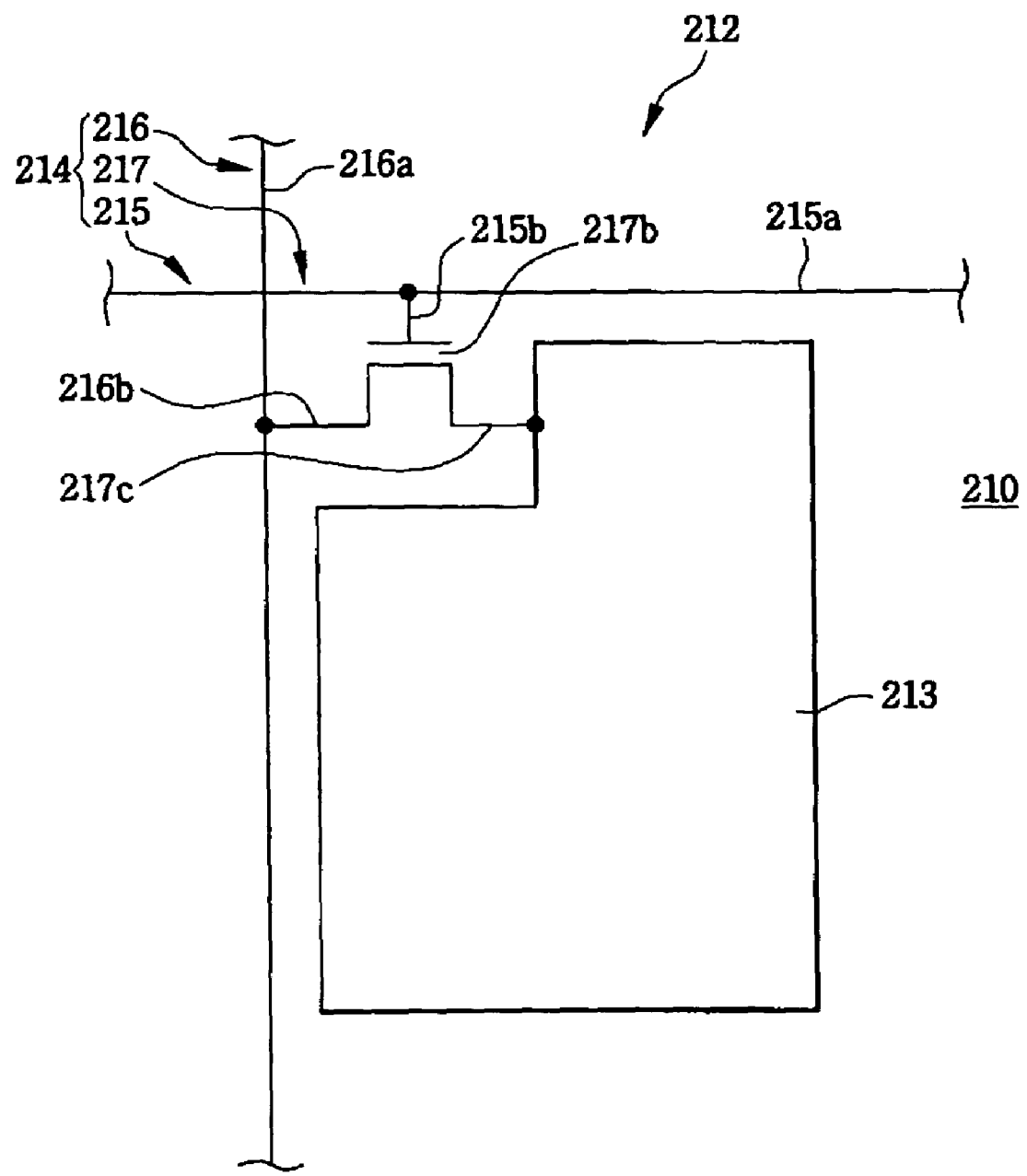
[Fig. 3]

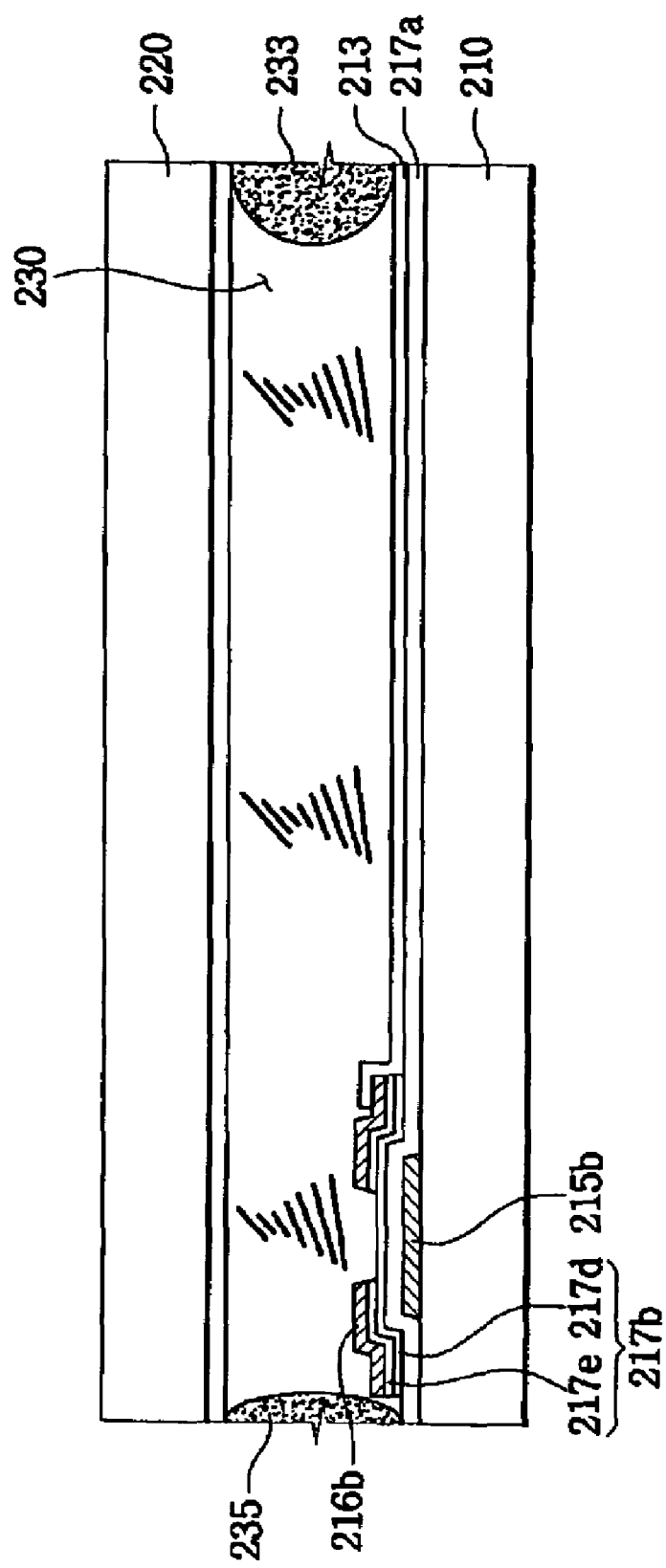
[Fig. 4]

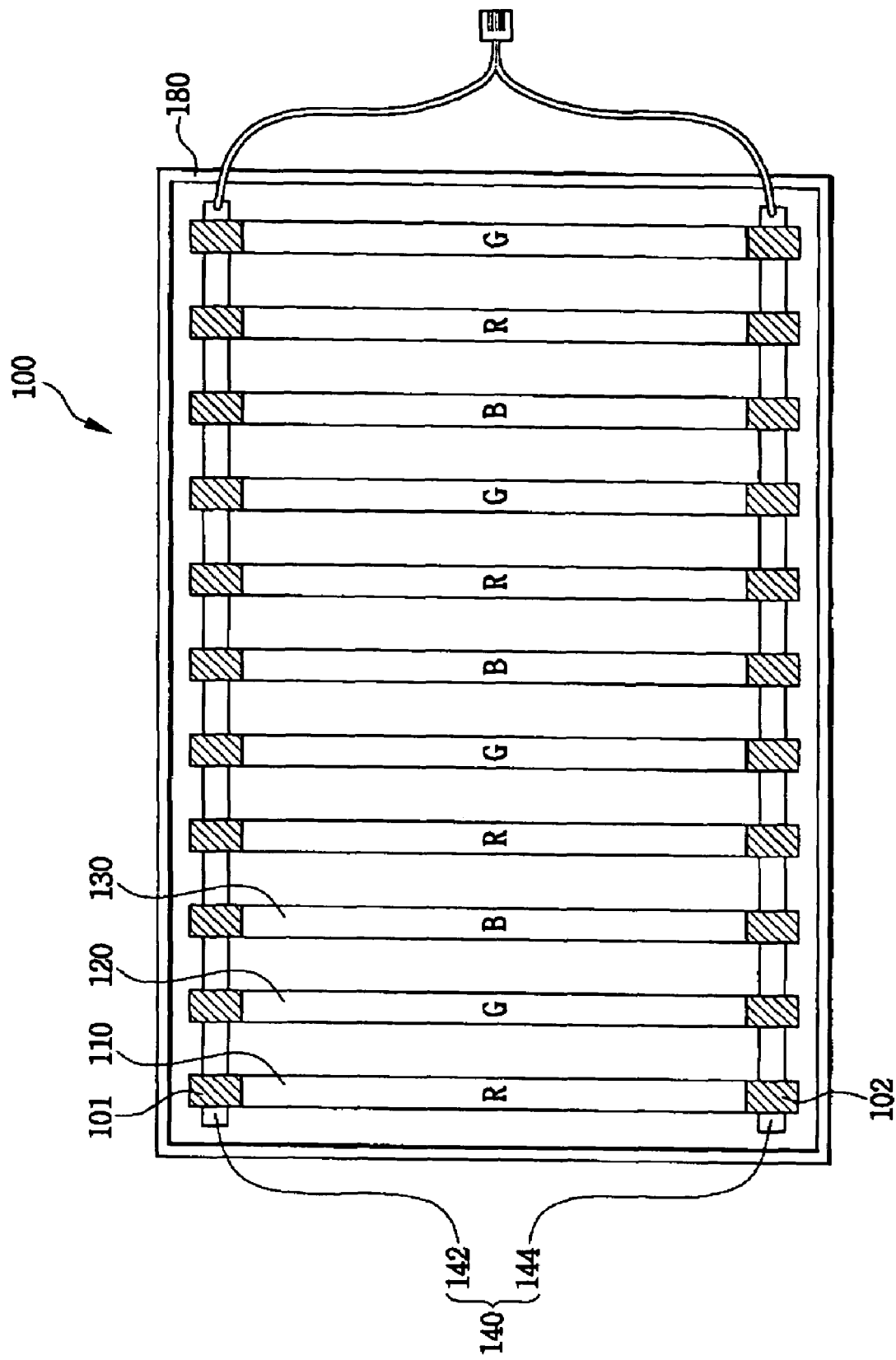
[Fig. 5]

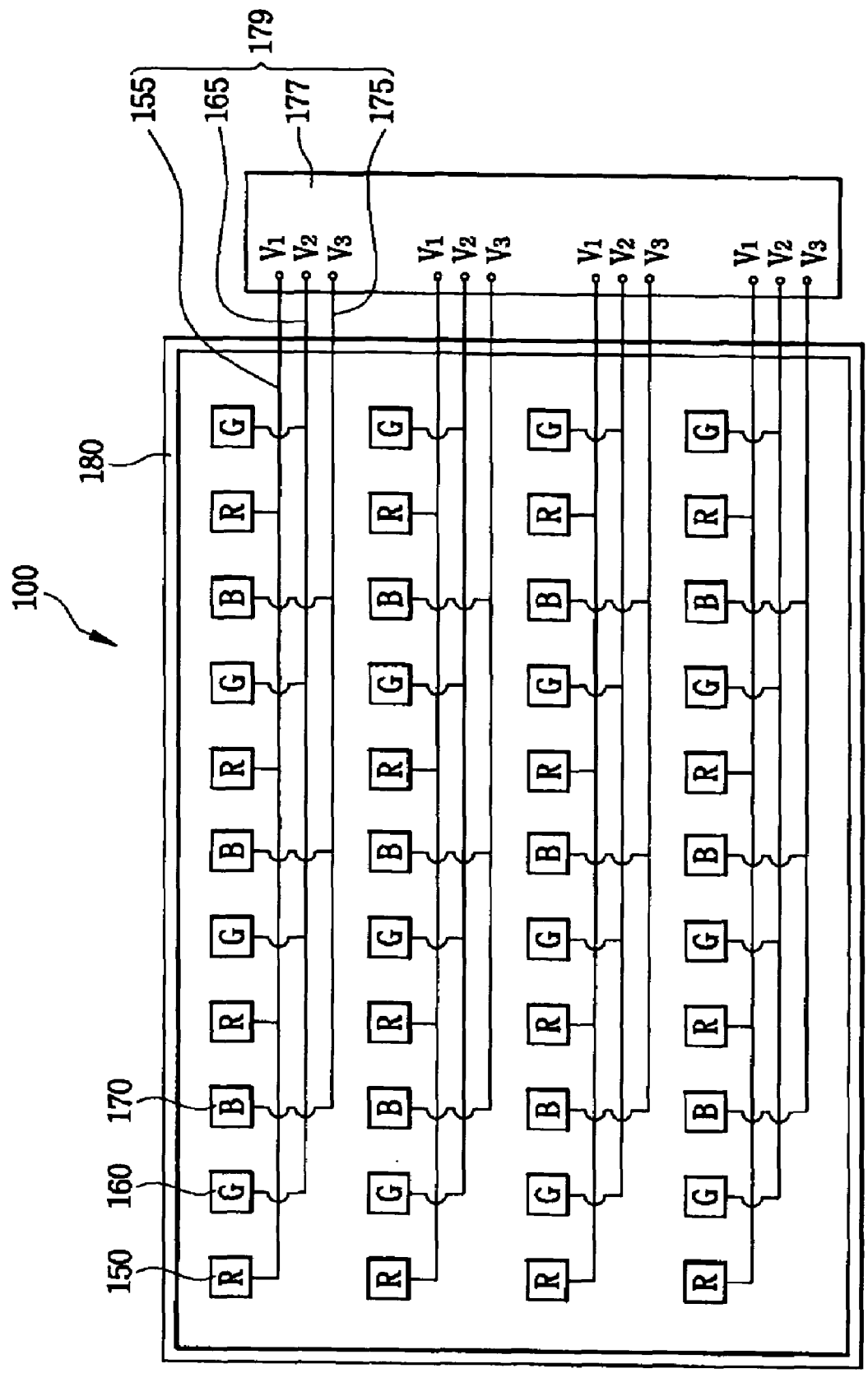
[Fig. 6]

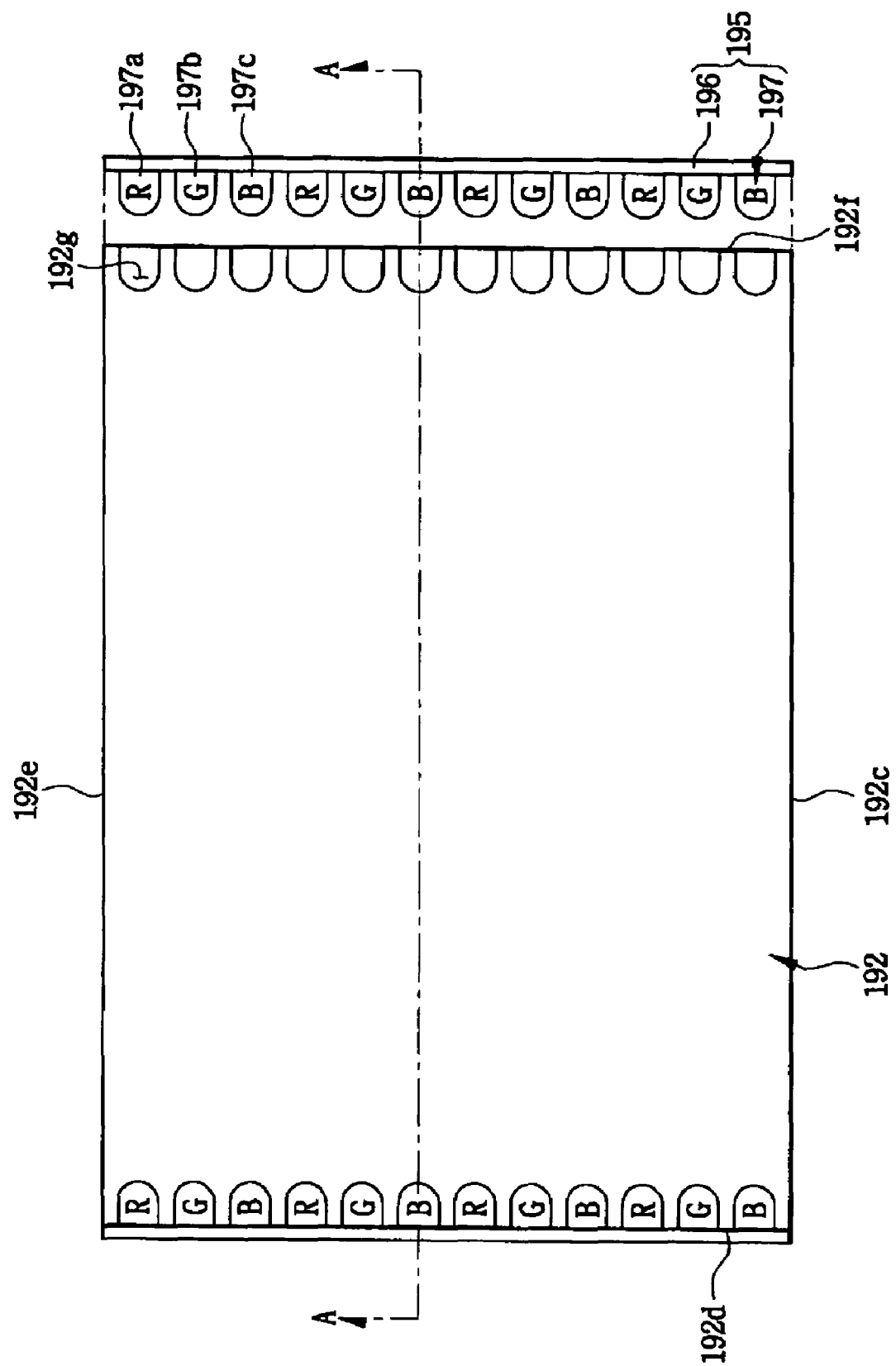
[Fig. 7]

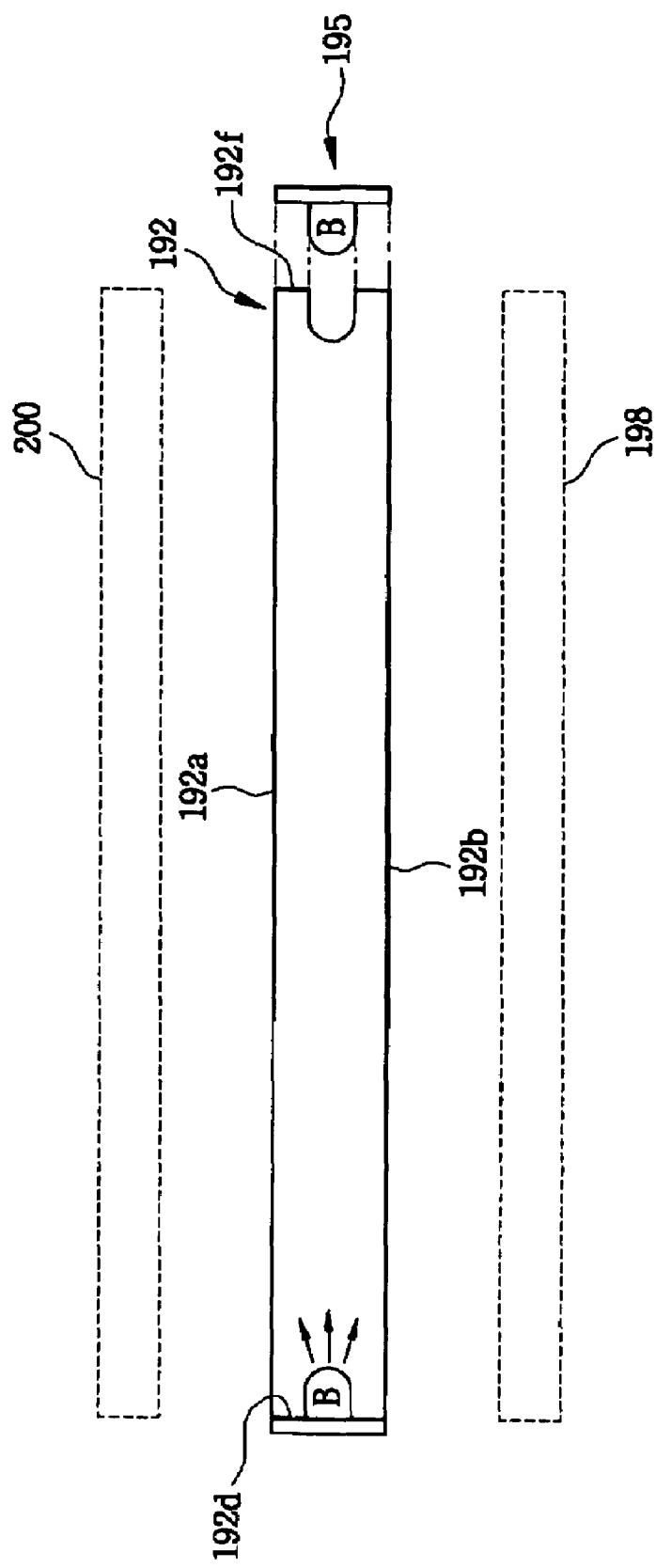
[Fig. 8]

[Fig. 9]
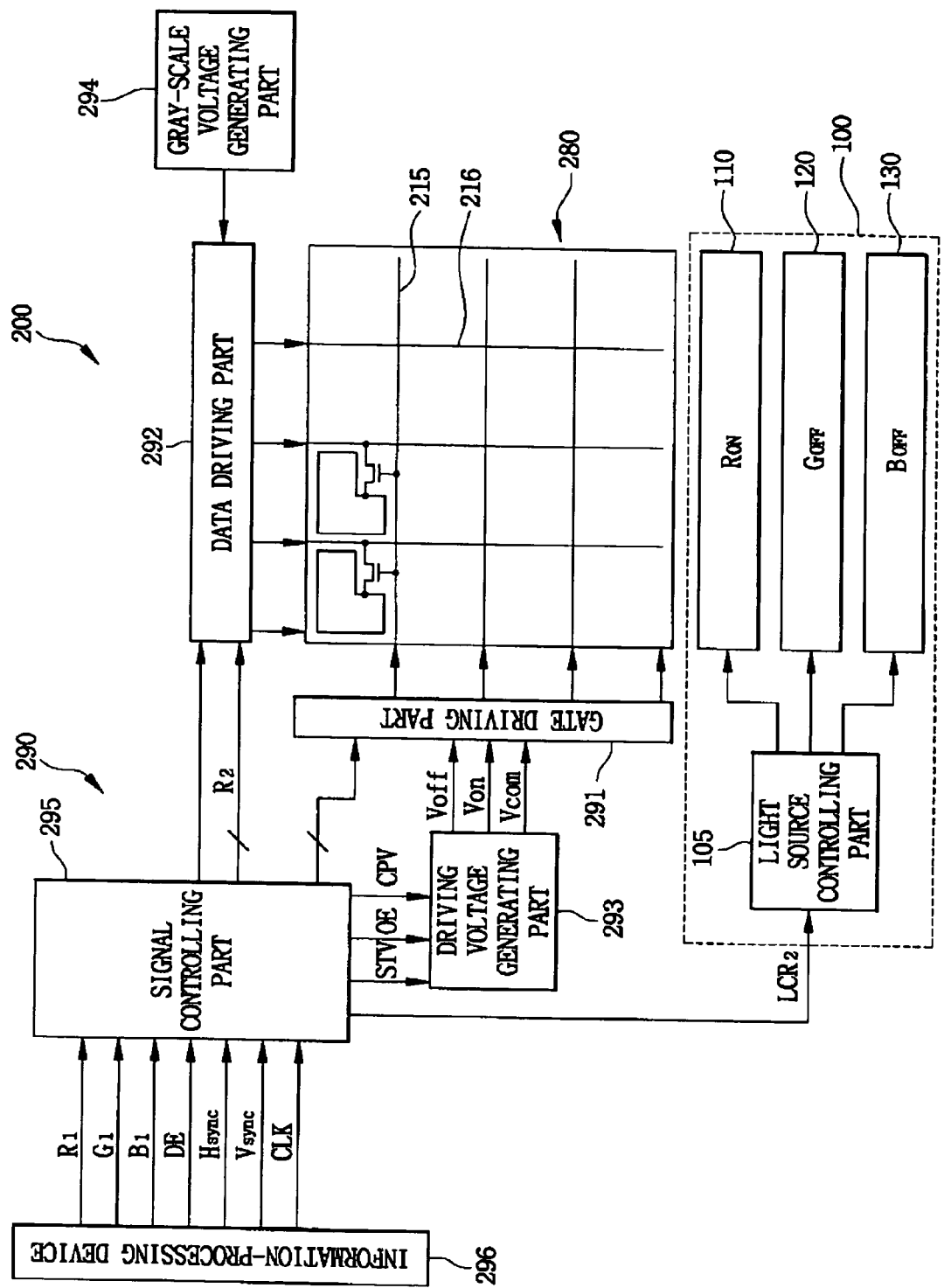

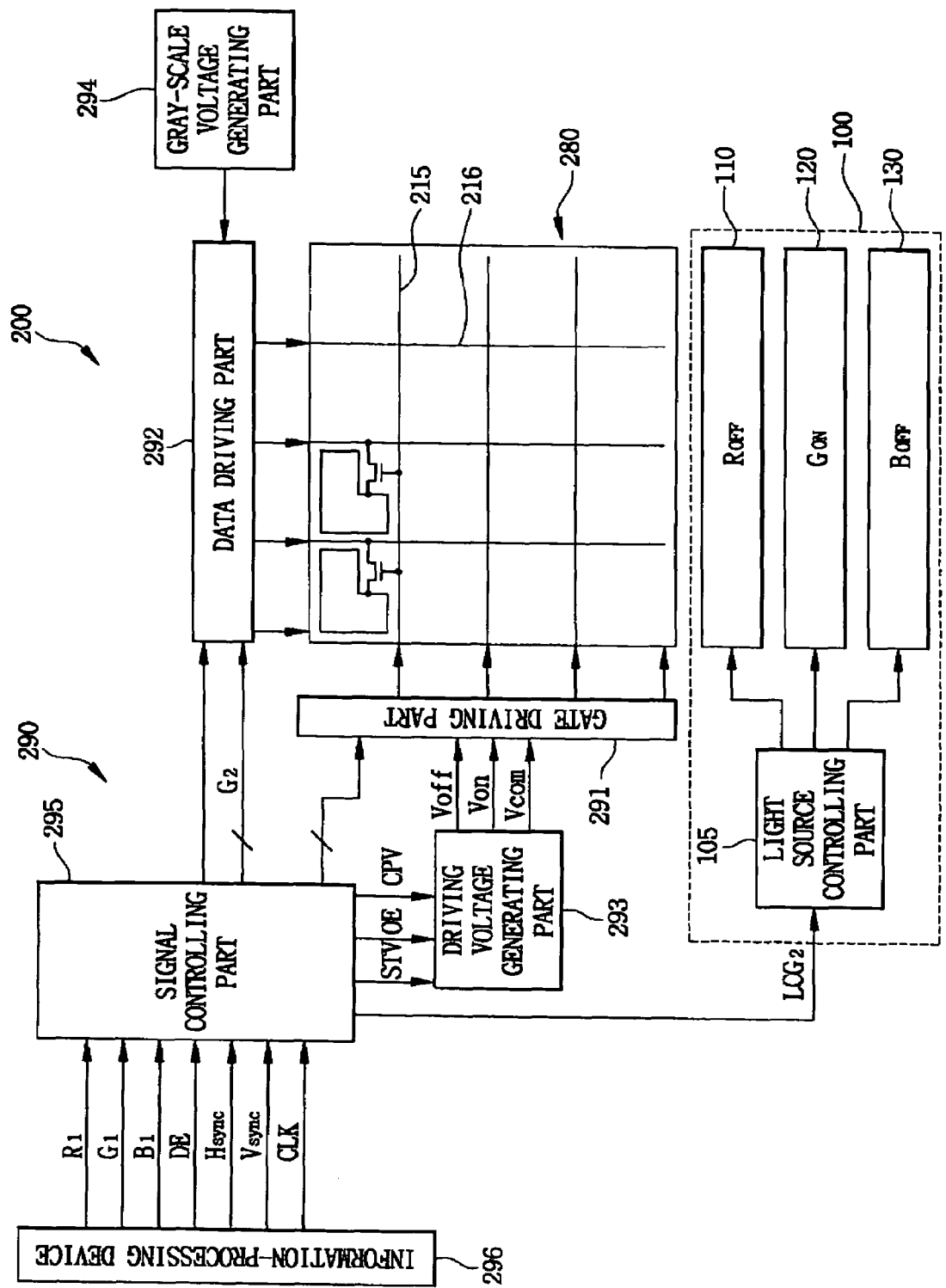
[Fig. 10]

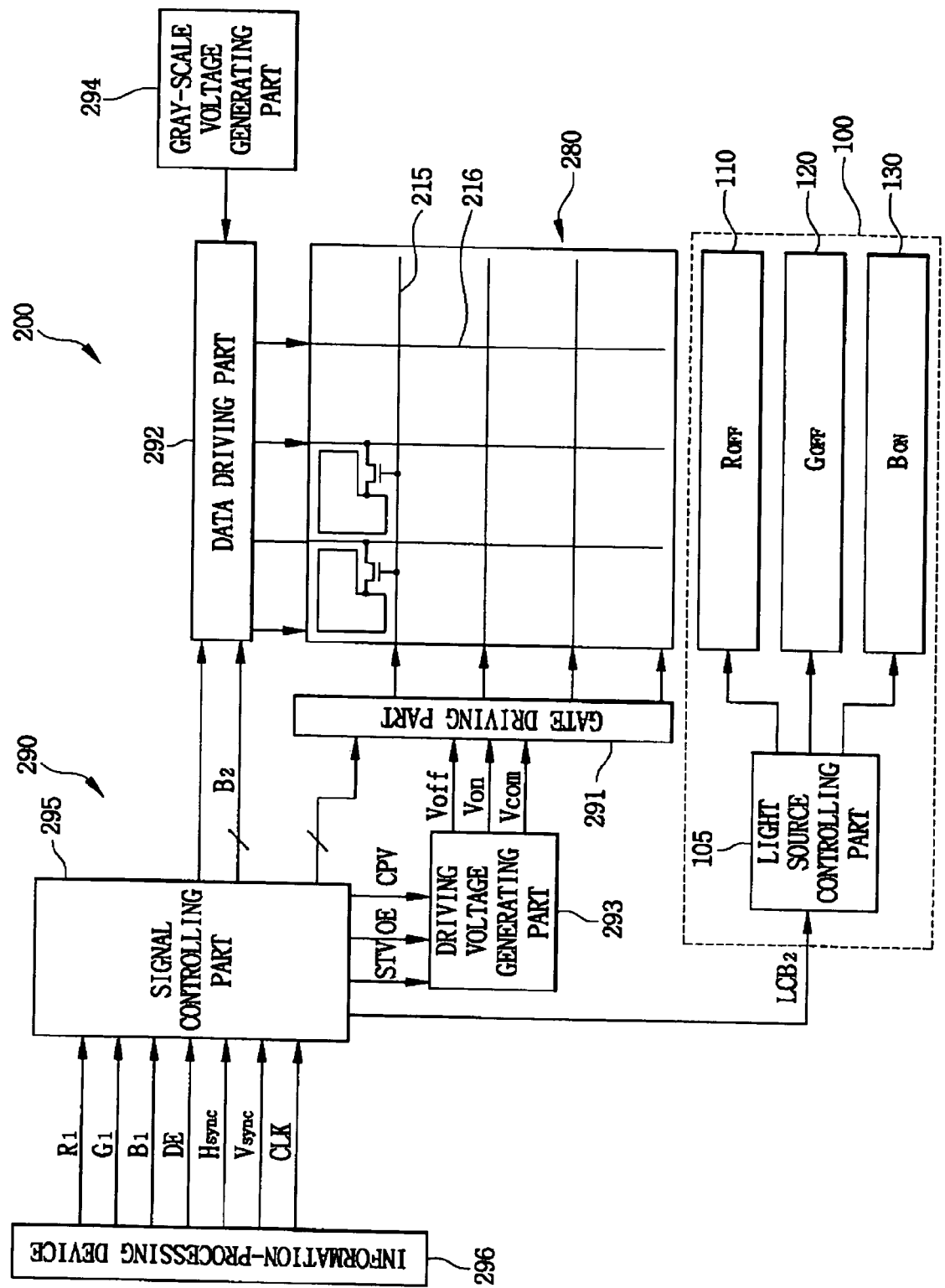
[Fig. 11]

[Fig. 12]
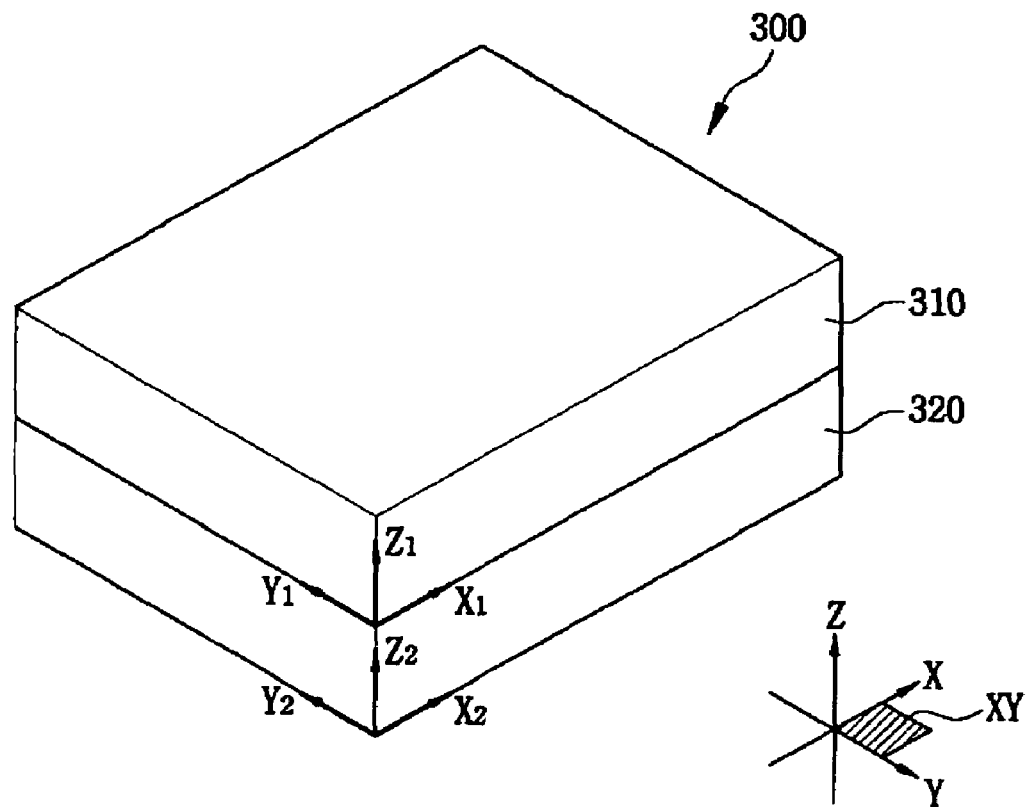
[Fig. 13]
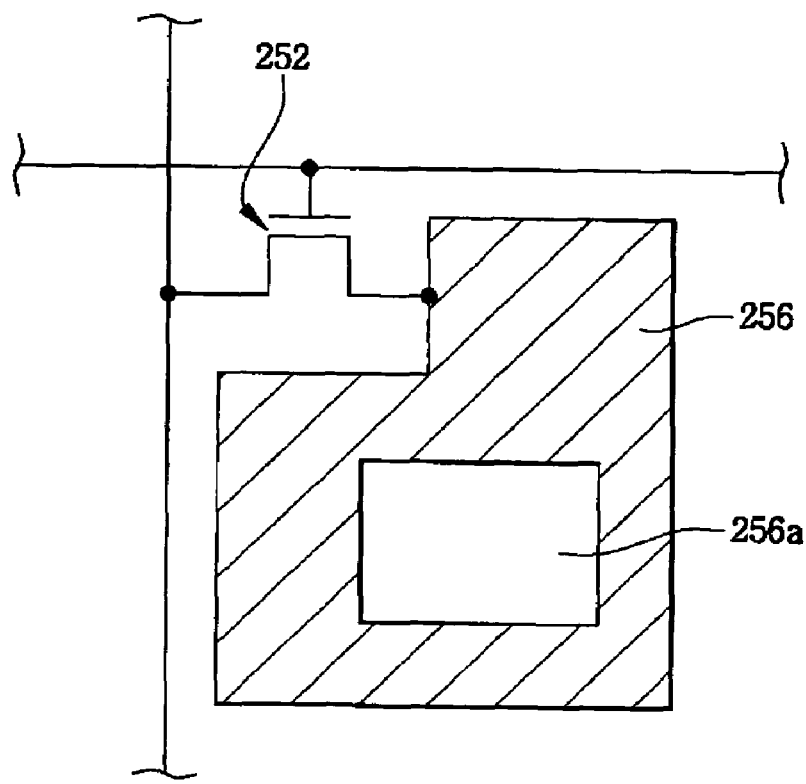

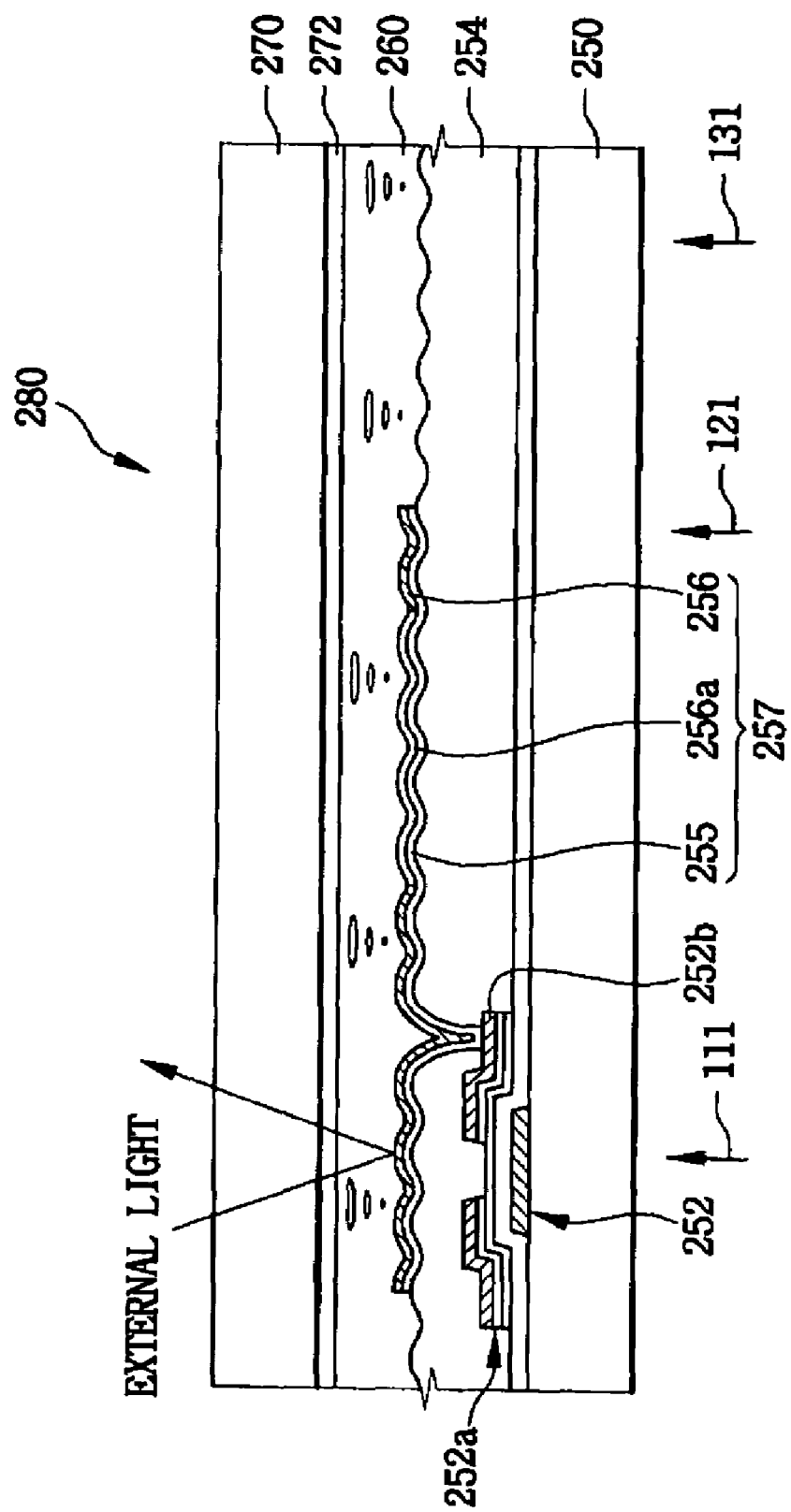

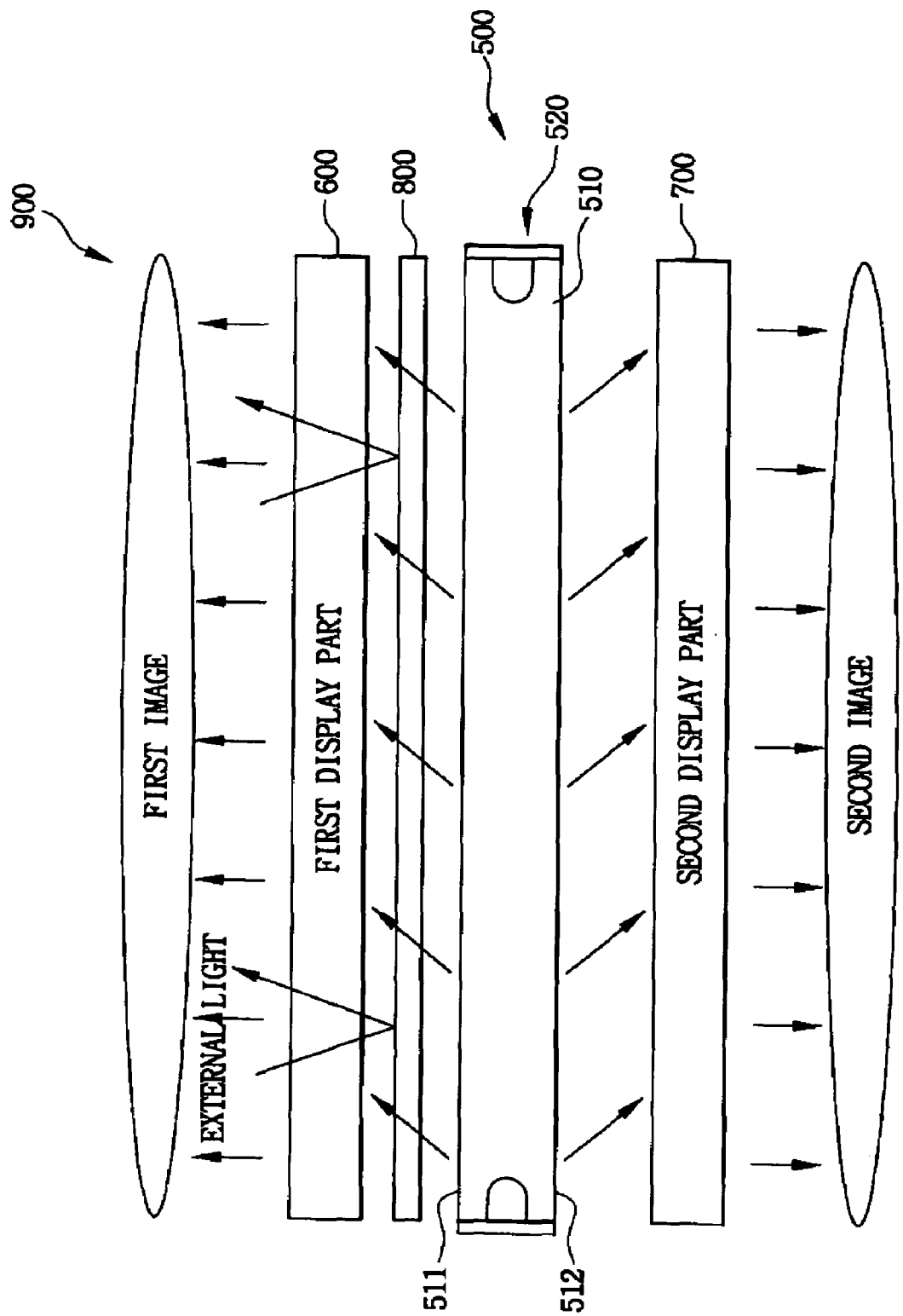
[Fig. 15]

LIQUID CRYSTAL DISPLAY APPARATUS

TECHNICAL FIELD

The present invention relates to a liquid crystal display (hereinafter, referred to as LCD) apparatus, and more particularly to an LCD apparatus having a simplified structure and an improved luminance.

BACKGROUND ART

Liquid crystal, generally, varies arrangement in response to an electric field applied thereto, and thus a light transmittance thereof may be changed. An LCD apparatus displays an image using the liquid crystal.

A conventional LCD apparatus includes an LCD panel controlling the liquid crystal and a light-supplying unit supplying white light in which red light, green light and blue light are mixed in an amount equal to each other.

Also, the conventional LCD apparatus further includes a first substrate and a second substrate opposite to the first substrate.

The first substrate has a plurality of pixels arranged in a matrix shape. Each of the pixels acts as a minimum unit for generating a color in the LCD apparatus. Each of the pixels includes three subpixels, thereby a light being generated by means of an additive color mixture of three primary colors. Each of the subpixels includes a pixel electrode and a thin film transistor (hereinafter, referred to as TFT). Gray-scale voltages having voltage levels different from each other are supplied to the respective subpixels through corresponding TFTs.

The second substrate has a common electrode and a color filter. The common electrode has an area enough to cover all of the pixels formed on the first substrate. The color filter has an area substantially equal to the area of the subpixels and is formed at a position corresponding to each of the subpixels.

Liquid crystal is disposed between the pixels and the common electrode. The liquid crystal varies arrangement in response to a voltage difference between the gray-scale voltage applied on each of the subpixels and a voltage applied on the common electrode, thereby changing a light transmittance of the liquid crystal.

The amount of the light having uniform luminance and provided to the first substrate may be varied in accordance with a position on which the liquid crystal is disposed while the light passes through the liquid crystal corresponding to each of the subpixels, thereby forming an image light. The image light is changed into a monochrome image light while passing through the color filters. The monochrome image light emitted from the three subpixels are mixed with each other so as to provide a color.

When the LCD panel has a diagonal length of about 6.4 inches and a resolution of 640×480, the LCD panel has pixels of about 307,200 and subpixels of about 921,600.

However, the image light is absorbed into the color filter while passing through the liquid crystal and color filter, so that the luminance of the monochrome image light may be decreased and image quality of the image may be deteriorated.

Also, since three subpixels are needed to generate a color, and each of the subpixels includes the TFT. As a result, a manufacturing process of the LCD panel may be complex, thereby decreasing yield of the LCD panel.

In addition, a driving module for driving the TFTs has a complicated structure because the TFTs connected to the subpixels are driven individually by means of the driving module.

Furthermore, a black matrix is disposed between the subpixels, on which the liquid crystal is not disposed, thereby decreasing an opening ratio and deteriorating luminance of a displayed image on the LCD panel.

DISCLOSURE OF INVENTION

Technical Problem

Accordingly, the present invention has been devised to solve the foregoing problems of the conventional art, and the present invention provides an LCD apparatus having a simplified structure and an improved luminance.

Technical Solution

The liquid crystal display (LCD) apparatus according to one aspect of the present invention includes an LCD panel assembly, a light supplying unit, and a light reflective-transmissive unit. The LCD panel assembly has a plurality of pixels to display a color image. The pixels control an arrangement of liquid crystal. The light supplying unit has a light source. The light source supplies red light during a time corresponding to one third of a frame, green light during the time and blue light during the time. The light reflective-transmissive unit is disposed between the light supplying unit and the LCD panel assembly to transmit the red light, the green light and the blue light and to reflect light externally provided to the LCD panel assembly, thereby improving luminance of the color image.

The LCD apparatus according to another aspect of the present invention includes a light supplying unit, a first liquid crystal display part, a second liquid crystal display part and a light reflective-transmissive film.

The light supplying unit includes a light guide plate and a light source. The light guide plate has a first light-exiting surface, a second light-exiting surface and a side surface. The second light-exiting surface is opposite to the first light-exiting surface. The side surface is disposed between the first light-exiting surface and the second light-exiting surface. The light source supplies red light during a time corresponding to one third of a frame, green light during the time and blue light during the time.

The first liquid crystal display part is opposite to the first light-exiting surface, and displays a first image by means of the red light, the green light and the blue light from the first light-exiting surface.

The second liquid crystal display part is opposite to the second light-exiting surface, and displays a second image by means of the red light, the green light and the blue light from the second light-exiting surface.

The light reflective-transmissive film is disposed between the first liquid crystal display part and the first light-exiting surface to transmit the red light, the green light and the blue light and to reflect light externally provided to the first liquid crystal display part.

Therefore, the LCD apparatus of the present invention displays an image by means of a white light as well as red light, green light and blue light, thereby improving luminance.

DESCRIPTION OF DRAWINGS

The above and other advantages of the present invention will become readily apparent by reference to the following detailed description when considered in conjunction with the accompanying drawings wherein:

FIG. 1 is a schematic view showing an LCD apparatus according to an exemplary embodiment of the present invention;

FIG. 2 is a cross-sectional view showing the LCD apparatus shown in FIG. 1;

FIG. 3 is a schematic view showing the pixel formed on a first substrate shown in FIG. 2

FIG. 4 is a cross-sectional view showing the pixel shown in FIG. 3;

FIG. 5 is a schematic view showing the light-supplying unit shown in FIG. 1;

FIG. 6 is a schematic view showing another light-supplying unit shown in FIG. 1;

FIG. 7 is a schematic view showing another light-supplying unit shown in FIG. 1;

FIG. 8 is a cross-sectional view cut along the line A-A' of FIG. 7;

FIGS. 9 to 11 are block diagrams showing the driving module shown in FIG. 1;

FIG. 12 is a perspective view showing the light reflective-transmissive film shown in FIG. 1;

FIG. 13 is a schematic view showing a TFT substrate of an LCD apparatus according to another exemplary embodiment of the present invention;

FIG. 14 is a cross-sectional view showing the LCD apparatus according to another exemplary embodiment of the present invention; and FIG. 15 is a schematic view showing an LCD apparatus according to another exemplary embodiment of the present invention.

BEST MODE

FIG. 1 is a schematic view showing an LCD apparatus 400 according to an exemplary embodiment of the present invention.

Referring to FIG. 1, the LCD apparatus 400 includes an LCD panel assembly 200 without a color filter, a light-supplying unit 100 having a light source and a light reflective-transmissive film 300. The LCD apparatus 400 may include a backlight assembly in lieu of the light-supplying unit 100.

FIG. 2 is a cross-sectional view showing the LCD apparatus 400 shown in FIG. 1.

Referring to FIG. 2, the LCD panel 280 includes a first substrate 210, a second substrate 220 and liquid crystal 230.

The first substrate 210 includes a plurality of pixels 212. Each of the pixels 212 acts as a minimum unit for generating a color in the LCD apparatus 400. When the LCD panel 280 has a diagonal length of 6.4 inches and a required resolution of 640×480, the LCD panel 280 has pixels of about 307,200.

In this exemplary embodiment, in order to improve luminance and to simplify structure of the LCD panel 280, each of the pixels 212 of the LCD panel 280 does not include a subpixel.

FIG. 3 is a schematic view showing the pixel formed on a first substrate shown in FIG. 2, and FIG. 4 is a cross-sectional view showing the pixel shown in FIG. 3.

Referring to FIGS. 3 and 4, a number of the pixels 212 are substantially equal to the resolution of the LCD panel 280. Each of the pixels 212 includes a pixel electrode 213 and a voltage supplying unit 214. The pixel electrode 213 is formed on the first substrate 210 and has a transparent conductive material, for example, indium tin oxide (ITO) or indium zinc oxide (IZO). The pixel electrode 213 is formed on the first substrate 210 in a thin film shape.

The voltage supplying unit 214 includes a gate bus line 215, a data bus line 216 and a thin film transistor (TFT) 217.

The gate bus line 215 has a gate line 215a and a gate electrode 215b branched from the gate line 215a. The data bus line 216 has a data line 216a and a source electrode 216b branched from the data line 216a.

Referring to FIGS. 3 and 4, the TFT 217 includes the gate electrode 215b, an insulating layer 216a, a channel layer 217b, the source electrode 216b and a drain electrode 217c. The insulating layer 217a insulates the gate electrode 215b from other elements such as the source electrode 216b and drain electrode 217c. The channel layer 217b corresponding to the gate electrode 215b is armed on the insulating layer 217a. The channel layer 217b includes an amorphous silicon thin film 217d and an n+ amorphous silicon thin film 217e. The n+ amorphous silicon thin film 217e has two pieces formed on the amorphous silicon thin film 217d and separated from each other. The source electrode 216b and the drain electrode 216c are disposed on the two pieces, respectively. The pixel electrode 213 is connected to the drain electrode 217c.

Referring to FIG. 2, the second substrate 220 includes a common electrode 222 formed over the second substrate 220. The common electrode 222 has a transparent conductive material such as ITO, IZO or the like.

In order to maintain a cell gap between the first and second substrates 210 and 220, a spacer 233 is disposed between the first substrate 210 and the second substrate 220. A sealant 235 is disposed on edges of the first substrate 210 and an edge of the second substrate 220 so as to prevent leakage of the liquid crystal 230.

The liquid crystal 230 is formed between the first substrate 210 and the second substrate 220 using a vacuum injection process or a dropping process.

Referring to FIG. 1, the light-supplying unit 100 provides a red light 111, a green light 121 and a blue light 131 to the liquid crystal 230 of the LCD panel 280.

FIG. 5 is a schematic view showing the light-supplying unit shown in FIG. 1.

Referring to FIG. 5, the light-supplying unit 100 includes red, green and blue light-supplying unit 110, 120 130, a voltage supplying module 140 and a receiving container 180. The red, green and blue light-supplying units 110, 120 and 130 generate the red light 111, green light 121 and blue light 131, respectively.

The red, green and blue light-supplying units 110, 120 and 130 comprise a cold cathode fluorescent lamp.

The red, green and blue light-supplying units 110, 120 and 130 are alternately disposed and parallel to each other.

Each of the red, green and blue light-supplying units 110, 120 and 130 includes a first electrode 101 and a second electrode 102.

The voltage-supplying module 140 includes a first voltage-supplying module 142 and a second voltage-supplying module 144. The first voltage-supplying module 142 is connected to the first electrode 101 to supply a first discharge voltage, and the second voltage-supplying module 144 is connected to the second electrode 102 to supply a second discharge voltage. A voltage difference between the first discharge voltage and the second discharge voltage is enough to transfer an electron between the first electrode 101 and the second electrode 102. The first voltage supplying module 142 and second voltage supplying module 144 receive the first discharge voltage and second discharge voltage from an inverter (not shown).

The receiving container 180 receives the red, green, blue light-supplying units 110, 120 and 130 and the voltage-supplying module 140.

FIG. 6 is a schematic view showing another light supplying unit shown in FIG. 1.

Referring to FIG. 6, the light supplying unit 100 includes a receiving container 180, a red light emitting diode 150, a green light emitting diode 160, a blue light emitting diode 170 and a voltage-supplying module 179.

The red, green and blue light emitting diodes 150, 160 and 170 are arranged in a matrix shape in the receiving container 180.

The voltage-supplying module 179 includes a first signal line 155, a second signal line 165, a third signal line 175 and a signal-supplying module 177. The first, second and third signal lines 155, 165, and 175 are arranged in a matrix shape. The first signal line 155 provides a first driving voltage $V_1$ to the red luminescent diode 150, the second signal line 165 provides a second driving voltage $V_2$ to the red luminescent diode 150, and the third signal line 155 provides a third driving voltage $V_3$ to the red luminescent diode 150. The signal supplying module 177 supplies the first, second and third driving voltage $V_1$, $V_2$ and $V_3$ to the first, second and third lines 155, 165 and 175, respectively.

The first, second and third driving voltage $V_1$, $V_2$ and $V_3$ may have a voltage level different from each other so that the red light emitting diode 150, the green light emitting diode 160 and the blue light emitting diode 170 may have substantially the same luminance.

FIG. 7 is a schematic view showing another light supplying unit shown in FIG. 1, and FIG. 8 is a cross-sectional view cut along the line A-A' of FIG. 7.

Referring to FIGS. 1, 7 and 8, a light supplying unit 100 includes a light guide plate 192 and a light-supplying module 195. The light guide plate 192 has a shape substantially identical to an LCD panel 200. For example, when the LCD panel 230 has a rectangular shape, the light guide plate 192 may have the rectangular shape.

Referring to FIG. 8, the light guide plate 192 includes a first light-exiting surface 192a, a second light-exiting surface 192b facing the first light-exiting surface 192a and a plurality of side surfaces 192c, 192d, 192e and 192f. The light guide plate 192 may have a wedge shape or a flat shape. In this exemplary embodiment, the first light-exiting surface 192a and the second light-exiting surface 192b are parallel to each other. The light guide plate 192 may also have a plurality of receiving recesses 192g formed on the side surfaces 192c and 192f so as to partially receive the light-supplying module 195.

The light-supplying module 195 is disposed in the receiving recesses 192g. The light-supplying module 195 includes a printed circuit board 196 and a light source 197. The 3-color light source 197 includes a red light emitting diode 197a, a green light emitting diode 197b and a blue light emitting diode 197c. The red, green and blue light emitting diode 197a, 197b and 197c are disposed on the printed circuit board 196 corresponding to the receiving recesses 192g.

Red light, green light and blue light are incident into the light guide plate 192 so that the red light, the green light and the blue light having a plane light source are generated from the first light-exiting surface 192a and the second light-exiting surface 192b, respectively. As shown in FIG. 8, when the LCD panel 200 is disposed on the first light-exiting surface 192a of the light guide plate 192, a reflecting surface 198 is disposed on the second light-exiting surface 192b of the light guide plate 192, thereby reflecting the red light, the green light and the blue light to the first light-exiting surface 192a adjacent to the LCD panel 200.

FIGS. 9 to 11 are block diagrams showing the driving module shown in FIG. 1.

Referring to FIG. 9, the driving module 290 includes a gate driving part 291, a data driving part 292, a driving voltage generating part 293 connected to the gate driving part 291, a gray-scale voltage generating part 294 connected to the data driving part 292, a light source controlling part 105 and a signal controlling part 295. The light source controlling part 105 is connected to the light supplying unit 100 so as to control the light-supplying unit 100. The signal controlling part 295 controls the gate driving part 291, data driving part 292, driving voltage-generating part 293 and gray-scale voltage generating part 294.

The gate driving part 291 is connected to the gate bus line 215 of the LCD panel 280. The gate driving part 291 supplies a gate-driving signal to each of the gate bus line 215 in response to a control signal from the signal controlling part 295. The gate-driving signal includes a gate turn-on signal $V_{on}$ and a gate turn-off signal $V_{off}$. The driving voltage generating part 293 generates a common voltage $V_{com}$ to supply the common voltage $V_{com}$ to a common electrode.

The data driving part 292 is connected to the data bus line 216 of the LCD panel 280. The data driving part 292 supplies a gray-scale voltage to the data bus line 216. The gray scale voltage is generated from the gray-scale voltage generating part 294.

The signal controlling part 295 controls the gate driving part 291, the data driving part 292, the driving voltage generating part 293 and the gray-scale voltage generating part 294. The signal controlling part 295 receives a video signal from an exterior information-processing device 296 such as a computer.

The video signal includes various signals such as a first red gray-scale signal $R_1$, a first green gray-scale signal $G_1$, a first blue gray-scale signal $B_1$, a vertical synchronizing signal $V_{sync}$, a horizontal synchronizing signal $H_{sync}$, a main clock signal CLK, a data enable signal DE and so on.

The signal controlling part 295 converts the first red gray-scale signal $R_1$, the first green gray-scale signal $G_1$ and the first blue gray-scale signal $B_1$ for an LCD panel into a second red gray-scale signal $R_2$, a second green gray-scale signal $G_2$ and a second blue gray-scale signal $B_2$, respectively.

Referring to FIG. 9, the signal controlling part 295 supplies the second red gray-scale signal $R_2$ to the data driving part 292 during a time corresponding to one-third of a frame. The data driving part 292 receives an analog gray-scale voltage corresponding to the second red gray-scale signal $R_2$ from the gray-scale voltage generating part 294 and outputs the analog gray-scale voltage to the data bus line 216.

The gate driving part 291 then supplies a gate turn-on pulse signal to the first gate bus line 215 in response to a gate control signal generated from the signal controlling part 295, thereby turning on all of TFTs connected to the first gate bus line 215.

The signal controlling part 295 repeats the processes aforementioned above such as output process of the second red gray-scale signal $R_2$ and output process of the gray-scale voltage, during the time corresponding to one-third of the frame to supply the red gray-scale voltage to the pixels.

When the signal controlling part 295 supplies the red gray-scale voltage to the pixels, the signal controlling part 295 supplies red light turn-on signal $LCR_2$ to the light source controlling part 105 so as to turn on red light generating unit 110. When the red light generating unit 110 is turned on, green light generating unit 120 and blue light generating unit 130 are turned off. The liquid crystal corresponding to the pixels are completely arranged when the signal controlling part 295 supplies the red light turn-on signal LCR$_2$ to the light source controlling part 105.

Thus, when the frame is 16.6 ms, the red light may be emitted outside the LCD panel during red light about 5.5 ms corresponding to one-third of the frame.

Referring to FIG. 10, the signal controlling part 295 supplies the second green gray-scale signal G$_2$ to the data driving part 292 during the time corresponding to one-third of the frame. The data driving part 292 receives the analog gray-scale voltage corresponding to the second green gray-scale signal G$_2$ and outputs the analog gray-scale voltage to the data bus line 216.

The date driving part 291 then supplies a gate turn-on pulse signal to the first gate bus line 215 in response to a gate control signal generated from the signal controlling part 295 so as to turn on all of TFTs connected to the gate bus line 215.

The signal controlling part 295 repeats the processes aforementioned above such as output process of the second green gray-scale signal G$_2$ and output process of the gray-scale voltage, during the time corresponding to one-third of the frame to supply the green gray-scale voltage to the pixels.

When the signal controlling part 295 supplies the green gray-scale voltage to the pixels, the signal controlling part 295 supplies green light turn-on signal LCG$_2$ to the light source controlling part 105 so as to turn on green light generating unit 120. When the green light generating unit 120 is turned on, red light generating unit 110 and blue light generating unit 130 are turned off. The liquid crystal corresponding to the pixels are completely arranged when the signal controlling part 295 supplies the green light turn-on signal LCG$_2$ to the light source controlling part 105.

Thus, when the frame is 16.6 ms, the green light may be emitted outside the LCD panel during red light about 5.5 ms corresponding to one-third of the frame.

Referring to FIG. 11, the signal controlling part 295 supplies the second blue gray-scale signal B$_2$ to the data driving part 292 during the time corresponding to one-third of the frame. The data driving part 292 receives the analog gray-scale voltage corresponding to the second blue gray-scale signal B$_2$ and outputs the analog gray-scale voltage to the data bus line 216.

The date driving part 291 then supplies a gate turn-on pulse signal to the first gate bus line 215 in response to a gate control signal generated from the signal controlling part 295 so as to turn on all of TFTs connected to the gate bus line 215.

The signal controlling part 295 repeats the processes aforementioned above such as output process of the second blue gray-scale signal B$_2$ and output process of the gray-scale voltage, during the time corresponding to one-third of the frame to supply the blue gray-scale voltage to the pixels.

When the signal controlling part 295 supplies the blue gray-scale voltage to the pixels, the signal controlling part 295 supplies blue light turn-on signal LCB$_2$ to the light source controlling part 105 so as to turn on blue light generating unit 130. When the blue light-generating unit 130 is turned on, red light generating unit 110 and green light generating unit 120 are turned off. The liquid crystal corresponding to the pixels are in a complete arrangement when the signal controlling part 295 supplies the green light turn-on signal LCB$_2$ to the light source controlling part 105.

Thus, when the frame is 16.6 ms, the blue light may be emitted outside the LCD panel during red light about 5.5 ms corresponding to one-third of the frame.

Therefore, the red light, the green light and the blue light are successively outputted from the LCD panel during the frame, so that a user may perceive an image by means of a shading effect of the red light, the green light and the blue light.

Referring to FIG. 1, in order to increase luminance of the LCD panel 280, the light reflective-transmissive film 300 is disposed between an LCD panel assembly 280 and a light supplying unit 100.

FIG. 12 is a perspective view showing the light reflective-transmissive film shown in FIG. 1.

Referring to FIG. 12, the light reflective-transmissive film 300 includes a first layer 310 and a second layer 320.

A refractive index of the first layer 310 of the light reflective-transmissive film 300 has an anisotropy with respective to an XY-plane, but a refractive index of the second layer 320 of the light reflective-transmissive film 300 does not have the anisotropy with respective to the XY-plane. X axis is parallel to an extended direction of the light reflective-transmissive film 300, Y axis is substantially parallel to a surface of the light reflective-transmissive film 300 and substantially perpendicular to the extended direction, and Z axis is substantially normal to a surface of the light reflective-transmissive film 300.

The light reflective-transmissive film 300 has a different anisotropy with respective to a transmittance and the refractive index according to a polarizing state and a direction of an incident light. For example, three main refractive indexes $n_x$, $n_y$ and $n_z$ of the first layer 310 and the second layer 320 are defined by the following expressions 1 to 5.

$$n1_x = n1_z \neq n1_y \quad \text{Expression 1}$$

$$n2_x = n2_z = n2_y \quad \text{Expression 2}$$

$$n1_x \neq n2_x \quad \text{Expression 3}$$

$$n1_y \neq n2_y \quad \text{Expression 4}$$

$$|n1_x - n2_x| < |n1_y - n2_y| \quad \text{Expression 5}$$

A refractive index difference between the first layer 310 and the second layer 320 in an X-direction is smaller than a refractive index difference between the first layer 310 and the second layer 320 in a Y-direction. Therefore, with reference to Fresnel's equation, when a non-polarized light is incident into the light reflective-transmissive film 300 in a Z-direction, a portion of the non-polarized light parallel to the Y-axis is almost completely reflected by the refractive index difference. Also, a portion of the non-polarized light parallel to the X-axis is partially reflected by the refractive index difference, and a remained portion of the non-polarized light parallel to the X-axis passes through the surface of the light reflective-transmissive film 300.

Two kinds of high molecular layers are alternately disposed to form a dielectric multi-layer of birefringency. One of high molecular layers has a large refractive index, and remained one of high molecular layers has a small refractive index.

For example, in case that the first layer 310 has the larger refractive index than that of the second layer 320. A relation of the refractive index between the first and second layers 310 and 320 is represented by the following expression 6.

$$n1_x = n1_z = 1.57, n1_y = 1.86$$

$$n2_x = n2_y = n2_z = 1.57 \quad \text{Expression 6}$$

According to Fresnel's equation, when refractive indexes of the first layer 310 in the X and Z directions are substantially equal to refractive indexes of the second layer 320 in the X and Z directions, and the refractive index of the first layer 310 in the Y-direction is different from the refractive index of the second layer 320 in the Y-direction, the portion of the non-polarized light, which is parallel to the Y-axis and incident into the light reflective-transmissive film 300 in the Z-direction, is completely reflected, and the remained portion of the non-polarized light parallel to the X-axis completely passes through the surface of the light reflective-transmissive film 300. As the dielectric multi-layer having the briefringency, a dual brightness enhancement film (hereinafter, refers to as DBEF) manufactured by 3M company is well known. The DBEF has two kinds of layers that are alternately disposed. The DBEF has polyethylenenaphtalate layers and polymethylmethacrylate (hereinafter, refers to as PMMA) layers. The polyethylenenaphtalate layers have high birefringency, and the PMMA layers have isotropy. Naphthalene has flat structure so that the naphthalene is easily stacked, and a refractive index of the naphthalene in stacked direction is different from a refractive index of the naphthalene in other direction. However, PMMA has amorphous high molecules to have substantially the same refractive index regardless of a direction of PMMA.

In case of the DBEF, a portion of a non-polarized light that is parallel to the Y axis is completely reflected, and a portion of a non-polarized light, which is parallel to the Y-axis and incident into the DBEF in the Z-direction, completely passes through the surface of the DBEF. However, in case of the light reflective-transmissive film 300, a portion of a non-polarized light that is parallel to the Y axis is completely reflected by the larger reflective index difference in the Y direction, but a portion of a non-polarized light, which is parallel to the X-axis and incident into the light reflective-transmissive film 300 in the Z-direction, is partially reflected by the smaller reflective index difference in the X direction, and the remained portion of the non-polarized light that is parallel to the X axis passes through the surface of the light reflective-transmissive film 300.

Two anisotropic light reflective-transmissive layers may be attached to form the light reflective-transmissive film 300. An anisotropic light reflective-transmissive layer and an isotropic light reflective-transmissive layer may also be attached to form the light reflective-transmissive film 300. The anisotropic light reflective-transmissive layer has different transmittances and different refractive indexes corresponding to polarizing state and polarizing direction of an incident light.

The light reflective-transmissive film 300 may have integral structure or multi-layered structure having separated layers.

Referring to FIG. 1, the light reflective-transmissive film 300 is disposed between the light supplying unit 100 and the LCD panel 280 so that red light 111, green light 121 and blue light 131 pass through the light reflective-transmissive film 300, which reflects light externally provided to the LCD panel 280 in an incident direction. The red light 111, the green light 121 and the blue light 131 are generated from the light supplying unit 100.

The red light 111, the green light 121, the blue light 131 and the external light pass through the LCD panel 280 so that a luminance of the external light is added to the luminance by the additive color mixture of the red light 111, the green light 121 and the blue light 131, thereby increasing luminance.

FIG. 13 is a schematic view showing a TFT substrate of an LCD apparatus according to another exemplary embodiment of the present invention, and FIG. 14 is a cross-sectional view showing the LCD apparatus according to another exemplary embodiment of the present invention.

Detailed descriptions of the identical elements are omitted, since elements of another exemplary embodiment of the present invention are substantially identical to the elements of the above exemplary embodiment of the present invention except an LCD panel.

Referring to FIGS. 13 and 14, an LCD panel includes a first substrate 250, a second substrate 270 and liquid crystal 260.

The first substrate 250 includes a voltage-supplying unit 252, an organic insulating layer 254 and a first electrode 257.

The voltage-supplying unit 252 of another exemplary embodiment is substantially identical to the voltage-supplying unit 212 of the exemplary embodiment. The organic insulating layer 254 is formed over the first substrate 250 to cover TFTs 252a of the voltage-supplying unit 252. The organic insulating layer 254 has contact holes, and each of the contact holes exposes a drain electrode 252b of the TFT 252a.

The first electrode 257 is formed on the organic insulating layer 254. The first electrode 257 has a transparent electrode 255 and a reflective electrode 256. The reflective electrode 256 has an opening window 256a. A number of the transparent electrodes 255 are substantially equal to a resolution of the LCD apparatus. A portion of each of the transparent electrodes 255 is connected to a drain electrode 252b of each of the TFTs 252a.

A reflective electrode 256 is formed on the transparent electrode 255. The transparent electrode is disposed on the organic insulating layer 254 in a matrix shape. The reflective electrode 256 includes metal having high reflectivity such as aluminum, aluminum alloy, or the like. The reflective electrode 256 includes an opening window 256a. Three-color light generated from a light-supplying unit 100 passes through the liquid crystal 260 by means of the opening window 256a. A portion of light externally provided to the LCD panel 280 is reflected in the opening window 256 to pass through the liquid crystal 260.

The second substrate 270 opposite to the first substrate 250 has a common electrode 272. The common electrode 272 is formed over the second substrate 270, and has a material such as ITO, IZO, or the like. The liquid crystal 260 is injected between the first substrate 250 and the second substrate 270.

FIG. 15 is a schematic view showing an LCD apparatus according to another exemplary embodiment of the present invention.

Detailed descriptions of the identical elements are omitted, since elements of another exemplary embodiment of the present invention are substantially identical to the elements of the exemplary embodiment of the present invention except an arrangement of an LCD panel.

Referring to FIG. 15, an LCD apparatus 900 includes a light supplying unit 500, a light reflective-transmissive film 800, a first display part 600 and a second display part 700.

The light supplying unit 500 includes a light guide plate 510 and a light-supplying module 520. The light supplying unit 500 supplies red light during a time corresponding to one third of a frame, green light during the time and blue light during the time to a first exiting surface 511 of the light guide plate 510 and a second exiting surface 512 of the light guide plate 510.

The first display part 600 is opposite to the first light-exiting surface 511 of the light guide plate 510, and the first display part 600 displays an image by means of red light, green light and blue light. The second display part 700 is opposite to the second light-exiting surface 512 of the light guide plate 510, and the second display part 700 displays an image by means of red light, green light and blue light.

The first display part 600 and the second display part 700 may display different images from each other by means of different driving signals. Sizes of the first display part 600 and the second display part 700 may also be different from each other. Preferably, a first reverse-prism sheet is disposed between the first display part 600 and the first light-exiting surface 511, and a second reverse-prism sheet is disposed between the second display part 700 and the second light-exiting surface 512. The first reverse-prism sheet and the second reverse-prism sheet control luminance and viewing angle.

The light reflective-transmissive film 800 may be disposed between the first display part 600 and the light guide plate 510. The red light, the green light and the blue light pass through the light reflective-transmissive film 800, which reflects light externally provided to the LCD panel. The external light is incident into the first display part 600. The first display part 600 displays an image by means of the red light, the green light, the blue light and the external light.

The second display part 700 displays an image by means of the red light, the green light and the blue light. The red light, the green light and the blue light are exited from the second light-exiting surface 512 of the light guide plate 500.

The first display part 600 may be a transmissive LCD panel without color filter or a reflective-transmissive LCD panel without color filter.

The second display part 700 may be a transmissive LCD panel without color filter or a reflective-transmissive LCD panel without color filter.

INDUSTRIAL APPLICABILITY

As mentioned above, the LCD apparatus of the present invention decreases loss of a light generated from a light supplying unit of an LCD apparatus, thereby improving luminance of an image exited from the LCD apparatus.

Although the exemplary embodiments of the present invention have been described, it is understood that the present invention should not be limited to these exemplary embodiments but various changes and modifications can be made by one ordinary skilled in the art within the scope of the present invention as hereinafter claimed.

The invention claimed is:

1. An LCD apparatus comprising:
   an LCD panel assembly having a plurality of pixels controlling an arrangement of liquid crystal so as to display a color image;
   a light supplying unit having independent light sources corresponding to red light, green light and blue light, respectively, the independent light sources supplying the red light during a time corresponding to a first one-third of a frame, the green light during a second one-third of the frame and the blue light during a third one-third of the frame;
   a light reflective-transmissive unit disposed between the light supplying unit and the LCD panel assembly so as to transmit the red light, the green light and the blue light and to reflect a light externally provided to the LCD panel assembly in order to improve luminance of the color image; and
   a light guide plate including side surfaces facing the light sources, a light-exiting surface facing the light reflective-transmissive unit,
   wherein the light guide plate has a plurality of receiving recesses to partially receive the light sources.

2. The LCD apparatus of claim 1, wherein the pixels comprise a transparent electrode transmitting the red light, the green light and the blue light.

3. The LCD apparatus of claim 1, wherein the light sources comprise a red light supplying unit emitting the red light, a green light supplying unit emitting the green light and a blue light supplying unit emitting the blue light.

4. The LCD apparatus of claim 3, wherein each of the red light supplying unit, the green light supplying unit and the blue light supplying unit comprises a light I emitting diode.

5. The LCD apparatus of claim 3, wherein the red light supplying unit, the green light supplying unit and the blue light supplying unit are alternately disposed.

6. The LCD apparatus of claim 1, wherein the light reflective-transmissive unit comprises a light reflective-transmissive film including a plurality of first layers and a plurality of second layers, the first and second layers have different refractive indexes from each other, and the first and second layers are alternately stacked.

7. The LCD apparatus of claim 6, wherein the light reflective-transmissive unit is disposed at a position facing the light supplying unit of the LCD panel assembly.

8. The LCD apparatus of claim 1, wherein the pixels comprise; a transparent electrode transmitting the red light, the green light and the blue light; and a reflective electrode disposed on the transparent electrode, the reflective electrode having a contact hole through which a portion of the transparent electrode is exposed.

9. The LCD apparatus of claim 1, wherein the red light, the green light and the blue light are successively outputted from the light supplying unit during each of the first, second, and third one-thirds of the frame, respectively.

* * * * *